(12) United States Patent
Sohn et al.

(10) Patent No.: US 11,066,496 B2
(45) Date of Patent: Jul. 20, 2021

(54) SUPER ABSORBENT POLYMER AND METHOD FOR PREPARING SAME

(71) Applicant: LG Chem, Ltd., Seoul (KR)

(72) Inventors: Jung Min Sohn, Daejeon (KR); Hyemin Lee, Daejeon (KR); Chang Sun Han, Daejeon (KR)

(73) Assignee: LG Chem, Ltd.

( * ) Notice: Subject to any disclaimer, the term of this patent is extended or adjusted under 35 U.S.C. 154(b) by 52 days.

(21) Appl. No.: 16/322,347

(22) PCT Filed: Nov. 8, 2017

(86) PCT No.: PCT/KR2017/012618
§ 371 (c)(1),
(2) Date: Jan. 31, 2019

(87) PCT Pub. No.: WO2018/117413
PCT Pub. Date: Jun. 28, 2018

(65) Prior Publication Data
US 2019/0194366 A1    Jun. 27, 2019

(30) Foreign Application Priority Data

Dec. 20, 2016   (KR) .................. 10-2016-0174935
Nov. 3, 2017    (KR) .................. 10-2017-0146287

(51) Int. Cl.
| | |
|---|---|
| *C08F 20/06* | (2006.01) |
| *C08J 3/075* | (2006.01) |
| *C08J 3/12* | (2006.01) |
| *C08J 3/24* | (2006.01) |
| *C08K 5/05* | (2006.01) |
| *B01J 20/26* | (2006.01) |
| *B01J 20/28* | (2006.01) |
| *C08F 220/06* | (2006.01) |
| *C08L 33/06* | (2006.01) |
| *C08F 2/50* | (2006.01) |

(52) U.S. Cl.
CPC ............ *C08F 20/06* (2013.01); *B01J 20/267* (2013.01); *B01J 20/28047* (2013.01); *C08F 2/50* (2013.01); *C08F 220/06* (2013.01); *C08J 3/075* (2013.01); *C08J 3/12* (2013.01); *C08J 3/245* (2013.01); *C08K 5/05* (2013.01); *C08L 33/06* (2013.01); *B01J 2220/68* (2013.01); *C08J 2333/02* (2013.01)

(58) Field of Classification Search
CPC .... C08F 20/06; C08J 3/075; C08J 3/12; C08J 3/245; C08J 2333/02; C08K 5/05; B01J 2220/68; B01J 20/67; B01J 20/28047
See application file for complete search history.

(56) References Cited

U.S. PATENT DOCUMENTS

| | | | |
|---|---|---|---|
| 4,446,261 A | 5/1984 | Yamasaki et al. | |
| 4,737,478 A | 4/1988 | Rainis | |
| 4,771,105 A | 9/1988 | Shirai et al. | |
| 5,140,076 A | 8/1992 | Hatsuda et al. | |
| 8,686,216 B2 | 4/2014 | Wattebled et al. | |
| 2005/0245393 A1 | 11/2005 | Herfert et al. | |
| 2009/0131255 A1 | 5/2009 | Ikeuchi et al. | |
| 2010/0072421 A1 | 3/2010 | Kitano et al. | |
| 2011/0301560 A1 | 12/2011 | Fujimura et al. | |
| 2014/0312273 A1 | 10/2014 | Wattebled et al. | |
| 2014/0378926 A1* | 12/2014 | Ota ................. | B01D 15/00 604/367 |
| 2016/0272745 A1 | 9/2016 | Daniel et al. | |

FOREIGN PATENT DOCUMENTS

| | | |
|---|---|---|
| EP | 1721663 A1 | 11/2006 |
| EP | 1448242 B1 | 6/2010 |
| EP | 2518092 A1 | 10/2012 |
| EP | 2905072 A1 | 8/2015 |
| EP | 3040361 A1 | 7/2016 |
| EP | 3040362 A1 | 7/2016 |
| EP | 3085439 A1 | 10/2016 |
| JP | S56161408 A | 12/1981 |
| JP | S57158209 A | 9/1982 |
| JP | S57198714 A | 12/1982 |
| JP | S62149335 A | 7/1987 |
| JP | S6456707 A | 3/1989 |
| JP | H01292004 A | 11/1989 |
| JP | H07045534 B2 | 5/1995 |
| JP | H09194598 A | 7/1997 |
| JP | 2011178969 A | 9/2011 |
| JP | 5558096 B2 | 7/2014 |
| KR | 20050036975 A | 4/2005 |
| KR | 20110114535 A | 10/2011 |
| KR | 2014-0107346 A * | 9/2014 |
| KR | 20140107346 A | 9/2014 |
| KR | 101511820 B1 | 4/2015 |
| WO | 9527739 A1 | 10/1995 |

OTHER PUBLICATIONS

Third Party Observation for PCT/KR2017/012618 submitted Apr. 15, 2019.
Third Party Observation for Application No. EP20170883448 dated May 4, 2020, 13 pages.
International Search Report for PCT/KR2017/012618, dated Mar. 13, 2018.
Odian, George, "Principles of Polymerization", John Wiley & Sons, 1981, p. 203.
Schwalm, Reinhold, "UV Coatings: Basics, Recent Developments and New Applications", Elsevier, Dec. 2006, 3 pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

The present invention relates to a super absorbent polymer and a method for preparing the same. According to the method for preparing a super absorbent polymer of the present invention, the super absorbent polymer +having improved absorption capacity and permeability can be prepared.

9 Claims, No Drawings

SUPER ABSORBENT POLYMER AND METHOD FOR PREPARING SAME

CROSS-REFERENCE TO RELATED APPLICATIONS

This application is a national phase entry under 35 U.S.C. § 371 of International Application No. PCT/KR2017/012618, filed Nov. 8, 2017, which claims priority to Korean Patent Application No. 10-2016-0174935, filed on Dec. 20, 2016, and Korean Patent Application No. 10-2017-0146287, filed on Nov. 3, 2017, the disclosures of which are incorporated herein by reference in their entirety.

FIELD OF THE INVENTION

The present invention relates to a super absorbent polymer and a method for preparing the same. More particularly, the present invention relates to a super absorbent polymer having improved absorption capacity and permeability, and a method for preparing the same.

DESCRIPTION OF THE RELATED ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for production of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

As a method for preparing such a super absorbent polymer, an inverse suspension polymerization method, an aqueous solution polymerization method or the like are known. For example, the inverse suspension polymerization is disclosed in Japanese Patent Laid-open Publication Nos. Sho56-161408, Sho57-158209, Sho57-198714, and so on. Furthermore, as the aqueous solution polymerization method, a thermal polymerization method in which a polymer gel is polymerized while being broken and cooled in a kneader equipped with a plurality of spindles, and a photo-polymerization method in which an aqueous solution with a high concentration is irradiated with UV rays or the like onto a belt to carry out the polymerization and drying at the same time are known.

The hydrogel polymer obtained through said polymerization reaction is generally marketed as a powdered product after it is dried and pulverized.

In a product using the super absorbent polymer, the permeability is an index for measuring a fluidity of a liquid to be absorbed. The permeability may vary depending on characteristics such as a particle size distribution of a crosslinked polymer, a shape of the particle and a connectivity of the openings between the particles, a surface modification of a swollen gel and the like. The fluidity of the liquid passing through the swollen particles may change depending on the permeability of a super absorbent polymer composition. When the permeability is low, it does not enable the liquid to easily flow through the super absorbent polymer composition.

One method for increasing a permeability of the super absorbent polymer may include, for example, a method for polymerizing a resin (polymer) and then carrying out a surface crosslinking reaction. In this case, a method of adding silica, clay or the like together with a surface crosslinking agent has been utilized. For example, U.S. Pat. Nos. 5,140,076 and 4,734,478 disclose the addition of silica during surface crosslinking of a dried super absorbent polymer powder.

However, there were problems in that the permeability is improved due to the addition of silica, clay or the like, but it shows that a centrifuge retention capacity and an absorbency under load are decreasing in proportion thereto, and it is easy to be separated from the super absorbent polymer by external physical impact during movement.

SUMMARY OF THE INVENTION

Technical Problem

For resolving the aforesaid problems of the prior arts, it is an object of the present invention to provide a method for preparing a super absorbent polymer having improved absorption capacity and permeability by adding an aliphatic alcohol of C6 or greater during surface crosslinking.

To achieve the above object, according to one aspect of the present invention, there is provided a method for preparing a super absorbent polymer comprising the steps of:

thermally polymerizing or photo-polymerizing a monomer composition including an acrylic acid-based monomer having an acidic group, of which at least a part is neutralized, and a polymerization initiator to form a hydrogel polymer;

drying the hydrogel polymer;

pulverizing the dried polymer;

mixing the pulverized polymer with a surface crosslinking agent and an aliphatic alcohol of C6 or greater;

heating the polymer obtained by mixing the surface crosslinking agent and the aliphatic alcohol of 06 or greater to carry out a surface modification.

According to another aspect of the present invention, there is provided a super absorbent polymer comprising a crosslinked polymer obtained by polymerizing and internally crosslinking an acrylic acid-based monomer having an acidic group, of which at least a part is neutralized; and a surface modifying layer formed on the surface of the crosslinked polymer, wherein a centrifuge retention capacity (CRC) measured according to EDANA method WSP 241.3 is 25 to 35 g/g, an absorbency under load (AUL) at 0.7 psi measured according to EDANA method WSP 242.3 is 20 to 30 g/g, and a surface tension is 65 to 73 mN/m.

According to the method for preparing a super absorbent polymer of the present invention, it is possible to produce a super absorbent polymer having improved absorption capacity and permeability by adding an aliphatic alcohol of C6 or greater during surface crosslinking.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a super absorbent polymer according to a specific embodiment of the present invention and a production method thereof will be described in detail.

The method for preparing a super absorbent polymer of the present invention comprises the steps of: thermally polymerizing or photo-polymerizing a monomer composition including an acrylic acid-based monomer having an acidic group, of which at least a part is neutralized, and a polymerization initiator to form a hydrogel polymer; drying the hydrogel polymer; pulverizing the dried polymer; mixing the pulverized polymer with a surface crosslinking agent and an aliphatic alcohol of C6 or greater having a core-shell structure; heating the polymer obtained by mixing the surface crosslinking agent and the aliphatic alcohol of C6 or greater to carry out a surface modification.

In the method for preparing a super absorbent polymer according to the present invention, the monomer composition, the raw material of the super absorbent polymer, includes an acrylic acid-based monomer having an acidic group, of which at least a part is neutralized, and a polymerization initiator The acrylic acid-based monomer is a compound represented by the following Chemical Formula 1:

$R^1$—$COOM^1$ [Chemical Formula 1]

in Chemical Formula 1, $R^1$ is an alkyl group having 2 to 5 carbon atoms and containing an unsaturated bond, $M^1$ is a hydrogen atom, a monovalent or divalent metal, an ammonium group or an organic amine salt.

Preferably, the acrylic acid-based monomer includes at least one selected from the group consisting of acrylic acid, methacrylic acid, monovalent metal salts thereof, bivalent metal salts, ammonium salts and organic amine salts thereof.

Here, the acrylic acid-based monomer may have an acidic group, of which at least a part is neutralized. Preferably, those partially neutralized with an alkaline substance such as sodium hydroxide, potassium hydroxide, ammonium hydroxide or the like can be used as the monomer. In this case, the degree of neutralization of the acrylic acid monomer may be 40 to 95 mol %, or 40 to 80 mol %, or 45 to 75 mol %. The range of the degree of neutralization can be adjusted according to the final properties. However, if the degree of neutralization is too high, neutralized monomers may be precipitated, thus rendering it difficult to smoothly progress the polymerization, and to the contrary, if the degree of neutralization is too low, the absorption capacity of the polymer may be significantly lowered, and also elastic rubber-like properties may be exhibited, which is difficult to handle.

The concentration of the acrylic acid-based monomer may be about 20% to about 60% by weight, preferably about 40% to about 50% by weight, based on the monomer composition including the raw materials of the super absorbent polymer and the solvent, and it may be controlled to be an adequate concentration in consideration of the polymerization time and the reaction conditions. However, when the concentration of the monomer is excessively low, the yield of the super absorbent polymer is low and there may be a problem in economic efficiency. In contrast, when the concentration is excessively high, it may cause problems in processes that a part of the monomer may be precipitated or the pulverization efficiency of the prepared hydrogel polymer appears low in the pulverizing process, and thus the physical properties of the super absorbent polymer may be decreased.

In the preparation method of the super absorbent polymer according to the present invention, the polymerization initiator used during the polymerization is not particularly limited as long as it is generally used in the preparation of the super absorbent polymer.

Specifically, the polymerization initiator that can be used herein includes a thermal polymerization initiator or a photo-polymerization initiator by UV irradiation, depending on the polymerization method. However, even in the case of using the photo-polymerization method, because a certain amount of heat is generated by the ultraviolet irradiation or the like and a certain degree of heat is generated according to the progress of the exothermic polymerization reaction, a thermal polymerization initiator may be additionally included.

The photo-polymerization initiator can be used without particular limitation as long as it is a compound capable of forming a radical by a light such as an UV ray.

The photo-polymerization initiator, for example, may include one or more initiators selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide. More various photo-polymerization initiators are well disclosed in "UV Coatings: Basics, Recent Developments and New Application" written by Reinhold Schwalm, (Elsevier, 2007), p 115, however the photo-polymerization initiator is not limited to the above-described examples.

The photo-polymerization initiator may be included in the concentration of about 0.01% to about 1.0% by weight based on the monomer composition. When the concentration of the photo-polymerization initiator is excessively low, the polymerization rate may become slow, and when the concentration of the photo-polymerization initiator is excessively high, the molecular weight of the super absorbent polymer becomes small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like; and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid) and the like. More various thermal polymerization initiators are well disclosed in "Principle of Polymerization" written by Odian, (Wiley, 1981), p 203, however the thermal polymerization initiator is not limited to the above-described examples.

The thermal polymerization initiator may be included in the concentration of about 0.001% to about 0.5% by weight based on the monomer composition. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

According to one embodiment of the present invention, the monomer composition may further include an internal crosslinking agent as the raw material of the super absorbent polymer. The internal crosslinking agent may include a crosslinking agent having one or more ethylene-based unsaturated functional groups in addition to one or more functional groups capable of reacting with the acrylic acid-based monomer; or a crosslinking agent having two or more functional groups capable of reacting with the substituents of the acrylic acid-based monomer and/or the substituents formed by hydrolysis of the monomer.

Specific examples of the internal crosslinking agent may include one or more agents selected from the group consisting of N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, and ethylene carbonate.

Such internal crosslinking agent may be included in the concentration of about 0.01% to about 0.5% by weight based on the monomer composition and can cross-link the polymerized polymer.

In the preparation method of the present invention, the monomer composition of the super absorbent polymer may further include additives such as a thickener, a plasticizer, a preservation stabilizer, an antioxidant, and so on, as needed.

The raw materials such as the acrylic acid-based monomer having an acidic group, of which at least a part is neutralized, the photo-polymerization initiator, the thermal polymerization initiator, the internal crosslinking agent, and the additives may be prepared in the form of the monomer composition solution which is dissolved in a solvent.

In this case, the solvent can be used without any limitation as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer composition.

Meanwhile, the method for forming a hydrogel polymer by the thermal polymerization or photo-polymerization of the monomer composition is not particularly limited as long as it is a polymerization method commonly used in the art.

Specifically, the polymerization method is largely classified into a thermal polymerization and a photo-polymerization depending on the polymerization energy source. The thermal polymerization may be typically carried out in a reactor like a kneader equipped with agitating spindles, and the photo-polymerization may be carried out in a reactor equipped with a movable conveyor belt. However, the above-described polymerization method is an example only, and the present invention is not limited thereto.

As one example, as described above, the thermal polymerization is carried out by supplying hot air to a reactor like a kneader equipped with the agitating spindles or by heating the reactor, thereby obtaining a hydrogel polymer. The resulting hydrogel polymer may have a size of centimeters or millimeters when it is discharged from the outlet of the reactor, depending on the type of the agitating spindles equipped in the reactor. Specifically, the size of the hydrogel polymer may vary depending on the concentration of the monomer composition injected thereto, the injection rate or the like, and the hydrogel polymer having a weight average particle diameter of 2 mm to 50 mm can be generally obtained.

Furthermore, when the photo-polymerization is carried out in a reactor equipped with a movable conveyor belt as described above, the form of the hydrogel polymer obtained may be usually a sheet-like hydrogel polymer having a width of the belt. In this case, the thickness of the polymer sheet may vary depending on the concentration of the monomer composition injected thereto and the injection rate. However, typically it is preferable to supply the monomer composition so that the sheet-like polymer having a thickness of about 0.5 cm to about 5 cm can be obtained. When the monomer composition is supplied so that the thickness of the sheet-like polymer becomes too thin, it is not preferred because the production efficiency is low. When the thickness of the sheet-like polymer exceeds 5 cm, the polymerization reaction may not uniformly occur throughout the whole thickness due to its excessively thick thickness.

The hydrogel polymer obtained by such method may have typically a moisture content of about 40% to about 80% by weight. Meanwhile, the term "moisture content" as used herein refers to the content of moisture in the total weight of the hydrogel polymer, which is obtained by subtracting the weight of the dried polymer from the weight of the hydrogel polymer. Specifically, it is defined as a value calculated by measuring the weight loss according to evaporation of water in the polymer during the drying process of increasing the temperature of the polymer through infrared heating. In this case, the moisture content is measured under the drying conditions where the temperature is increased from room temperature to 180° C. and then the temperature is maintained at 180° C., and the total drying time is set to 20 minutes, including 5 minutes for the temperature rising step.

Subsequently, a step of drying the hydrogel polymer thus obtained is carried out.

In this case, in order to increase the efficiency of the drying step, a coarsely pulverizing step may be further carried out before drying, as needed.

A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the pulverizing step may be carried out so that the particle diameter of the hydrogel polymer becomes about 2 mm to about 10 mm.

Pulverizing the hydrogel polymer into a particle diameter of less than 2 mm is technically not easy due to its high moisture content, and agglomeration may occur between the pulverized particles. Meanwhile, if the polymer is pulverized into a particle diameter of greater than 10 mm, the effect of increasing the efficiency in the subsequent drying step may be insignificant.

The hydrogel polymer pulverized as described above or the hydrogel polymer immediately after polymerization without the pulverizing step is subjected to a drying step. In this case, the drying temperature of the drying step may be about 150° C. to about 250° C. When the drying temperature is less than 150° C., it is likely that the drying time becomes too long or the physical properties of the super absorbent polymer finally formed is deteriorated, and when the drying temperature is higher than 250° C., only the surface of the polymer is dried, and thus it is likely that fine powder is generated during the subsequent pulverizing step and the physical properties of the super absorbent polymer finally formed is deteriorated. Therefore, the drying step may be preferably carried out at a temperature of about 150° C. to about 200° C., and more preferably at a temperature of about 160° C. to about 180° C.

Meanwhile, the drying time may be about 20 to about 90 minutes, in consideration of the process efficiency, but it is not limited thereto.

In the drying step, the drying method may also be selected and used without any limitation if it is a method generally used for drying the hydrogel polymer. Specifically, the drying step may be carried out by a method such as hot air supply, infrared irradiation, microwave irradiation or ultraviolet irradiation. When the drying step as above is finished, the moisture content of the polymer may be about 0.1% to about 10% by weight.

Subsequently, the dried polymer obtained through the drying step is subjected to a pulverization step.

The polymer powder obtained through the pulverizing step may have a particle diameter of about 150 µm to about 850 µm. Specific examples of a pulverizing device that can be used to achieve the above particle diameter may include a pin mill, a hammer mill, a screw mill, a roll mill, a disc mill, a jog mill or the like, but the present invention is not limited to the above-described examples.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of about 150 µm to about 850 µm is classified and only the polymer powder having such a particle diameter is subjected to the surface modification reaction and finally commercialized.

Next, to the pulverized polymer, a surface crosslinking agent and an aliphatic alcohol of C6 or greater are added and mixed. Then, the pulverized polymer is subjected to the surface modification step by applying a heat to these mixtures and raising the temperature.

The surface modification is a step of inducing a crosslinking reaction on the surface of the pulverized polymer in the presence of a surface crosslinking agent to form a super absorbent polymer having more improved physical properties. Through such surface modification, a surface modifying layer (surface crosslinking layer) is formed on the surface of the pulverized polymer particles.

The surface modification can be carried out by a conventional method of increasing the crosslinking density of the surface of the polymer particle. For example, it can be carried out by a method of mixing a solution containing a surface crosslinking agent and the pulverized polymer and causing a crosslinking reaction.

Further, generally, the surface crosslinking agent is applied to the surface of the super absorbent polymer particle. Therefore, this reaction occurs on the surface of the super absorbent polymer particle, which improves crosslinking properties on the surface of the particle without substantially affecting the inside of the particle. Thus, the surface-crosslinked super absorbent polymer particles have a higher level of crosslinking near the surface than in the inside.

In the prior arts, a method of adding a porous silica or clay and the like in addition to the surface crosslinking agent was used to increase the permeability of the super absorbent polymer. However, the above-mentioned silica or clay and the like have a porosity and thus the permeability is improved by the addition thereof, but it shows that as a centrifuge retention capacity and an absorbency under load are decreasing in proportion thereto, and the physical bonding with the super absorbent polymer is not strong and thus it is easy to be separated from the super absorbent polymer by external physical impact during movement.

However, in the preparation method of the present invention, the surface crosslinking reaction can be carried out by adding an aliphatic alcohol having C6, that is, having 6 or more carbon atoms together with a surface crosslinking agent, thereby exhibiting the effect of improving the permeability without decreasing a centrifuge retention capacity and an absorbency under load.

The hydroxy group (—OH) of the aliphatic alcohol of C6 or greater is chemically bonded by the surface reaction of the pulverized polymer, and an alkyl chain equal to or greater than C6 is present on the surface of the polymer. Thus, in the case where the super absorbent polymer is prepared by a polymer in which the aliphatic alcohol of C6 or greater is bonded to the surface, when the super absorbent polymer is swollen by absorbing water, due to the long alkyl chain equal to or greater than C6 present on the surface of the polymer, it can prevent the swollen particles from being agglomerated or aggregated with each other in response to increased pressure, thereby having improved liquid permeability. In addition, the alkyl chain can impart hydrophobicity to the surface of the polymer, thereby facilitate permeation and diffusion of moisture.

According to one embodiment of the present invention, as the aliphatic alcohol of C6 or greater, primary, secondary or tertiary alcohols of C6 to C20 can be mentioned, but primary alcohols of C6 to C16 can be preferably used. More preferably, one or more selected from the group consisting of stearyl alcohol, lauryl alcohol, and cetyl alcohol may be used, but the present invention is limited thereto.

The content of the aliphatic alcohol of C6 or greater may be about 0.001 to about 2 parts by weight, or about 0.01 to about 1 part by weight, preferably about 0.01 to about 0.5 part by weight, more preferably about 0.05 to about 0.3 part by weight, based on 100 parts by weight of the pulverized polymer. If the content of the aliphatic alcohol of C6 or greater is excessively small, it hardly shows the effect of improving the permeability due to the addition of the aliphatic alcohol of C6 or greater. If the content is too high, it is possible to prevent penetration of moisture and cause a decrease in the centrifuge retention capacity.

The aliphatic alcohol of C6 or greater may be added separately before adding the surface crosslinking agent to the pulverized polymer, or may be added together with the surface crosslinking agent.

The method for adding the surface crosslinking agent and the aliphatic alcohol of C6 or greater to the pulverized polymer is not limited in its constitution. A method of adding the surface crosslinking agent, the aliphatic alcohol of C6 or greater and the pulverized polymer to a reaction vessel and then mixing them, or a method of spraying the surface crosslinking agent and the aliphatic alcohol of C6 or greater on the polymer powder, a method of continuously supplying the polymer, the surface crosslinking agent and the aliphatic alcohol of C6 or greater in a mixer continuously operated and mixing them, and the like can be used.

Meanwhile, since the aliphatic alcohol of C6 or greater has low solubility in water, it can be mixed with the polymer by dry mixing in a powder state, or by raising the temperature to the melting point or higher to make a liquid state followed by spraying.

According to one embodiment of the present invention, when mixing the surface crosslinking agent and the aliphatic alcohol of C6 or greater with the polymer, the aliphatic alcohol of C6 or greater in powder or liquid form may be first mixed with the polymer prior to mixing the surface crosslinking agent.

When the surface crosslinking agent is added, it may be added in the form of a surface crosslinking solution by further mixing together with water. When water is added, there is an advantage that the surface crosslinking agent can be uniformly dispersed in the polymer. Herein, water is preferably added at a ratio of about 1 to about 10 parts by weight based on 100 parts by weight of the polymer, for the purpose of inducing a uniform distribution of the surface crosslinking agent and preventing the agglomeration of the polymer powder, while optimizing the depth of the penetration from the surface of the crosslinking agent.

Further, the surface crosslinking agent is not particularly limited as long as it is a compound capable of reacting with functional groups of the polymer.

In order to improve the properties of the produced super absorbent polymer, one or more selected from the group consisting of a polyhydric alcohol compound; an epoxy compound; a polyamine compound; a haloepoxy compound; a condensation product of the haloepoxy compound; an oxazoline compound; a mono-, di- or poly-oxazolidinone compound; a cyclic urea compound; a polyvalent metal salt; and an alkylene carbonate compound may be preferably used as the surface crosslinking agent.

Specific examples of the polyhydric alcohol compound may include one or more selected from the group consisting of a mono-, di-, tri-, tetra- or polyethylene glycol, mono-propylene glycol, 1,3-propanediol, dipropylene glycol, 2,3,4'-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or α-methylephichlorohydrin. Meanwhile, the mono-, di-, or polyoxazolidinone compound may include, for example, 2-oxazolidinone and the like.

Further, the alkylene carbonate compound may include ethylene carbonate and the like. These may be used alone or in combination with each other. On the other hand, to increase the efficiency of the surface crosslinking process, among these surface crosslinking agents, one or more of polyhydric alcohols having 2 to 10 carbon atoms may be used.

The amount of the surface crosslinking agent added may be suitably selected depending on the kind of the surface crosslinking agent added or the reaction conditions. However, the surface crosslinking agent may be typically used in an amount of about 0.001 to about 5 parts by weight, preferably about 0.01 to about 3 parts by weight, and more preferably about 0.05 to about 2 parts by weight, based on 100 parts by weight of the polymer.

When the amount of the surface crosslinking agent used is excessively small, the surface crosslinking reaction hardly occurs, and when the amount is higher than 5 parts by weight based on 100 parts by weight of the polymer, the absorption capacity and the physical properties may be decreased due to excessive surface crosslinking reaction.

The super absorbent polymer obtained in accordance with the preparation method of the present invention prevents the swollen polymer particles from being agglomerated with each other by distribution of the aliphatic alcohol of C6 or greater on the surface, thereby having improved permeability. Also, unlike the case where silica or clay is added in the prior art, the super absorbent polymer according to the preparation method of the present invention can minimize a reduction in the physical properties of the super absorbent polymer such as a centrifuge retention capacity and an absorbency under load and have a relatively strong physical bonding with the polymer resin and thus, reduce generation of a phenomenon of separation due to impact during movement. Therefore, less deviation of physical properties occurs even during long-term transportation and storage.

The polymer particles to which the surface crosslinking agent and the aliphatic alcohol of C6 or greater are added, are heated at a temperature of about 160 to about 200° C., preferably about 170 to about 190° C. for about 20 to about 100 minutes, preferably about 30 to about 90 minutes, and thereby the surface crosslinking reaction by the surface crosslinking agent, the bonding reaction of the aliphatic alcohol of C6 or greater, and the drying can be carried out at the same time. When the crosslinking reaction temperature is less than 160° C. or the reaction time is too short, the surface crosslinking reaction does not occur properly and thus the permeability may be lowered. When the reaction temperature is more than 200° C. or the reaction time is too long, there may be a problem that the centrifuge retention capacity is deteriorated.

The temperature raising means for the surface crosslinking reaction is not particularly limited. The heating can be carried out by providing a heating medium or directly providing a heating source. The type of heat medium that can be used here includes a heated fluid such as steam, hot air, hot oil, etc., but the present invention is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but the present invention is not limited to the above-described examples.

The super absorbent polymer obtained in accordance with the preparation method of the present invention can have improved permeability without deteriorating physical properties such as a centrifuge retention capacity and an absorbency under load.

For example, the super absorbent polymer obtained in accordance with the above-mentioned preparation method can satisfy the range where P defined by the following Equation 1 is 0.85 to 1.20.

$$P = SFC * 10^7 / (CRC + AUL) \quad \text{[Equation 1]}$$

in Equation 1,

CRC means a centrifuge retention capacity (unit: g/g/) measured according to EDANA method WSP 241.3, AUL means an absorbency under load (unit: g/g) at 0.7 psi measured according to EDANA method WSP 242.3, and SFC means a saline flow conductivity (unit: $cm^3*sec/g$).

The P in Equation 1 above is a parameter capable of evaluating the balance of a centrifuge retention capacity, an absorbency under load and a liquid permeability, and it is considered that as it is closer to 1, it show physical properties with the balance of the centrifuge retention capacity, the absorbency under load and the liquid permeability.

The super absorbent polymer prepared by the preparation method of the present invention may have the P calculated by Equation 1 of about 0.85 or more, about 0.90 or more, or about 0.95 or more, and about 1.20 or less, or about 1.15 or less, or about 1.10 or less, and can have balanced physical properties.

The super absorbent polymer prepared by the preparation method of the present invention may have a centrifuge retention capacity (CRC) in a range of about 25 g/g or more, or about 26 g/g or more, or about 27 g/g or more, and about 35 g/g or less, or about 30 g/g or less, or about 29 g/g or less, as measured according to EDANA method WSP 241.3.

Further, the super absorbent polymer prepared by the preparation method of the present invention may have an absorbency under load (AUL) at 0.7 psi in a range of about 20 g/g or more, or about 22 g/g or more, or about 24 g/g or more, and about 30 g/g or less, or about 28 g/g or less, or about 27 g/g or less, as measured according to EDANA method WSP 242.3.

Further, the super absorbent polymer prepared by the preparation method of the present invention may have a saline flow conductivity (SFC) of about $45*10^{-7}$ $cm^3*sec/g$ or more, or about $48*10^{-7}$ $cm^3*sec/g$ or more or, about $50*10^{-7}$ $cm^3*sec/g$ or more, and about $80*10^{-7}$ $cm^3*sec/g$ or less, or about $70*10^{-7}$ $cm^3*sec/g$ or less, or about $65*10^{-7}$ $cm^3*sec/g$ or less.

The saline flow conductivity can be measured according to the method disclosed in [0184]-[0189] in column 16 of U.S. Patent Application Publication No. 2009-0131255.

According to one embodiment of the present invention, there is provided a super absorbent polymer comprising a crosslinked polymer obtained by polymerizing and internally crosslinking an acrylic acid-based monomer having an acidic group, of which at least a part is neutralized; and a surface modifying layer formed on the surface of the crosslinked polymer, wherein a centrifuge retention capacity (CRC) measured according to EDANA method WSP 241.3 is 25 to 35 g/g, an absorbency under load (AUL) at 0.7 psi measured according to EDANA method WSP 242.3 is 20 to 30 g/g, and a surface tension is 65 to 73 mN/m.

The crosslinked polymer obtained by polymerizing and internally crosslinking an acrylic acid-based monomer having an acidic group, of which at least a part is neutralized is the same as described above in the preparation method of a super absorbent polymer of the present invention.

The super absorbent polymer of the present invention has improved absorption capacity and permeability by adding an aliphatic alcohol of C6 or greater to modify the surface of the super absorbent polymer during the surface crosslinking step of the crosslinked polymer.

The hydroxy group of the aliphatic alcohol of C6 or greater is chemically bonded by the surface reaction of the polymer, and an alkyl chain equal to or greater than C6 is present on the surface of the polymer. Thus, when a polymer in which the aliphatic alcohol of C6 or greater is bonded to the surface is swollen by absorbing water, due to the long alkyl chain equal to or greater than C6 present on the surface of the polymer, it can prevent the swollen particles from being agglomerated or aggregated with each other in response to increased pressure, thereby having improved permeability.

In addition, the super absorbent polymer of the present invention may have a surface tension of 65 mN/m or more, or 67 mN/m or more, or 70 mN/m or more, and 73 mN/m or less, or 72 mN/m or less.

The surface tension of the super absorbent polymer is a physical property different from the centrifuge retention capacity, the absorbency under load and the permeability, and an index capable of evaluating the leakage of urine in a diaper containing a super absorbent resin. The surface tension means a surface tension measured for a salt water after swelling the super absorbent polymer in the salt water. When the surface tension of the super absorbent polymer is low, there is a high possibility that a urine leakage phenomenon occurs in a diaper or the like produced using the super absorbent polymer. According to the super absorbent polymer of the present invention, it has a proper range of surface tension while maintaining high centrifuge retention capacity and transparency, so that the possibility of leakage can be reduced to thereby produce a high-quality sanitary article.

Further, the super absorbent polymer of the present invention may have a saline flow conductivity (SFC) of about $45*10^{-7}$ $cm^3*sec/g$ or more, or about $48*10^{-7}$ $cm^3*sec/g$ or more, or about $50*10^{-7}$ $cm^3*sec/g$ or more, and about $80*10^{-7}$ $cm^3*sec/g$ or less, or about $70*10^{-7}$ $cm^3*sec/g$ or less, or about $65*10^{-7}$ $cm^3*sec/g$ or less. The saline flow conductivity can be measured according to the method disclosed in [0184]-[0189] in column 16 of U.S. Patent Application Publication No. 2009-0131255.

Further, the super absorbent polymer of the present invention may have a centrifuge retention capacity (CRC) measured according to EDANA method WSP 241.3 of about 25 g/g or more, or about 26 g/g or more, or about 27 g/g or more, and about 35 g/g or less, or about 30 g/g or less, or about 29 g/g or less.

The centrifuge retention capacity (CRC) is measured according to EDANA method WSP 241.3 and can be expressed by the following Mathematical Formula 1:

$$CRC(g/g) = \{[W_2(g) - W_1(g)] / W_0(g)\} - 1 \quad \text{[Mathematical Formula 1]}$$

in Mathematical Formula 1, $W_0$ (g) is a weight (g) of the polymer, $W_1$ (g) is a weight (g) of the device, which is measured after performing dehydration by using a centrifuge without the polymer at 250 G for 3 minutes, and $W_2$ (g) is a weight of the device including the polymer, which is measured after immersing and absorbing the polymer in 0.9 wt % physiological saline solution at room temperature for 30 minutes and then performing dehydration by using a centrifuge at 250 G for 3 minutes.

Further, the super absorbent polymer of the present invention may have an absorbency under load (AUL) at 0.7 psi measured according to EDANA method WSP 242.3 of about 20 g/g or more, or about 22 g/g or more, or about 24 g/g or more, and about 30 g/g or less, or about 28 g/g or less, or about 27 g/g or less.

The absorbency under load (AUL) can be expressed by the following Mathematical Formula 2:

AUL(g/g)=[$W4$(g)−$W3$(g)]/$W0$(g)    [Mathematical Formula 2]

in Mathematical Formula 2,

W0 (g) is a weight (g) of the polymer,

W3 (g) is the total sum (g) of a weight of the polymer and a weight of the device capable of providing a load to the polymer, and W4 (g) is the total sum (g) of a weight of the polymer having moisture absorbed and a weight of the device capable of providing a load to the absorbent polymer, after providing moisture to the polymer under a load (0.7 psi) for 60 minutes.

Further, the super absorbent polymer of the present invention may have improved permeability without deteriorating physical properties such as a centrifuge retention capacity and an absorbency under load.

For example, the super absorbent polymer of the present invention can satisfy the range where P defined by the following Equation 1 is 0.85 to 1.20.

P=SFC*$10^7$/(CRC+AUL)    [Equation 1]

in Equation 1,

CRC means a centrifuge retention capacity (unit: g/g) measured according to EDANA method WSP 241.3, AUL means an absorbency under load (unit: g/g) at 0.7 psi measured according to EDANA method WSP 242.3, and SFC means a saline flow conductivity (unit: $cm^3$*sec/g).

The P in Equation 1 above is a parameter capable of evaluating the balance of a centrifuge retention capacity, an absorbency under load and a liquid permeability, and it is considered that as it is closer to 1, it show physical properties with the balance of the centrifuge retention capacity, the absorbency under load and the liquid permeability.

The super absorbent polymer prepared by the preparation method of the present invention may have the P calculated by Equation 1 of about 0.85 or more, about 0.90 or more, or about 0.95 or more, and about 1.20 or less, or about 1.15 or less, or about 1.10 or less, and thus can have balanced physical properties.

The super absorbent polymer has improved permeability due to the alkyl chain present on the surface modifying layer, and it does not occur a phenomenon of separation due to impact during movement, without a reduction in physical properties such as a centrifuge retention capacity and an absorbency under load, thereby showing less deviation of physical properties during long-term transportation and storage, and can prevent the particles from being agglomerated or aggregated with each other, thereby having improved permeability. In addition, the alkyl chain can impart hydrophobicity to the surface of the polymer, thereby facilitate permeation and diffusion of moisture.

The present invention will be described in more detail with reference to the following Examples. However, the following Examples are for illustrative purposes only, and the present invention is not intended to be limited by these Examples.

Example

Preparation of Super Absorbent Polymer

Example 1

In a 3 L glass container equipped with a stirrer, a nitrogen feeder and a thermometer, 500 g of acrylic acid, 3 g of ethoxylated (15)-trimethylolpropane triacrylate, and 0.04 g of diphenyl(2,4,6-trimethylbenzoyl)-phosphine oxide were added and dissolved, Then, the aqueous solution of water-soluble unsaturated monomer was prepared by adding 896.4 g of a 24.5% sodium hydroxide solution while feeding nitrogen continuously. The aqueous solution of water-soluble unsaturated monomer was cooled to 70° C. 500 g of this aqueous solution was added to a stainless steel container having a width of 250 mm, a length of 250 mm and a height of 30 mm and then subjected to ultraviolet irradiation (dose: 10 mV/$cm^2$) to carry out the UV polymerization for 90 seconds, thereby obtaining a hydrogel polymer. The obtained hydrogel polymer pulverized into a size of 2 mm*2 mm, and then the water content thereof was measured and the result was 40.1%.

The obtained hydrogel polymer was spread on a stainless wire gauze having a hole size of 600 μm so as to be the thickness of about 30 mm, and dried in a hot air oven at 180° C. for 30 minutes. The dried polymer was pulverized by using a pulverizing machine and classified with a standard sieve according to ASTM to obtain a base polymer powder having a particle size of 150 to 850 μm.

0.1 Part by weight of stearyl alcohol was dry mixed with 100 parts by weight of the base polymer powder, and then a surface crosslinking solution containing 1 part by weight of ethylene carbonate, 4 parts by weight of water and 0.02 part by weight of silica was sprayed and mixed. The mixture was placed in a container composed of a stirrer and a double jacket, and then subjected to a surface crosslinking reaction at 185° C. for 60 minutes. Then, the surface-treated powder was classified through a standard sieve according to ASTM standard to obtain a super absorbent polymer powder having a particle size of 150 to 850 μm.

Example 2

A super absorbent polymer powder was obtained in the same manner as in Example 1, except that 0.05 parts by weight of stearyl alcohol was mixed with 100 parts by weight of the base polymer powder in Example 1.

Example 3

A base polymer was prepared in the same manner as in Example 1.

A surface crosslinking solution containing 1 part by weight of ethylene carbonate, 0.1 part by weight of stearyl alcohol, 4 parts by weight of water and 0.02 part by weight of silica was sprayed and mixed with 100 parts by weight of the base polymer powder. The mixture was placed in a container composed of a stirrer and a double jacket, and then subjected to a surface crosslinking reaction at 185° C. for 60 minutes. Then, the surface-treated powder was classified through a standard sieve according to ASTM standard to obtain a super absorbent polymer powder having a particle size of 150 to 850 μm.

Example 4

A super absorbent polymer powder was obtained in the same manner as in Example 1, except that 0.1 part by weight of lauryl alcohol instead of 0.1 part by weight of stearyl alcohol was dry mixed with 100 parts by weight of the base polymer powder in Example 1.

Example 5

A super absorbent polymer powder was obtained in the same manner as in Example 1, except that both 0.1 part by weight of stearyl alcohol and 0.1 part by weight of lauryl alcohol were dry mixed with 100 parts by weight of the base polymer powder in Example 1.

Example 6

A super absorbent polymer powder was obtained in the same manner as in Example 1, except that 0.2 part by weight of stearyl alcohol was dry mixed with 100 parts by weight of the base polymer powder in Example 1.

Example 7

A super absorbent polymer powder was obtained in the same manner as in Example 1, except that 0.1 part by weight of cetyl alcohol instead of 0.1 part by weight of stearyl alcohol was dry mixed with 100 parts by weight of the base polymer powder in Example 1.

Comparative Example 1

A super absorbent polymer powder was obtained in the same manner as in Example 1, except that stearyl alcohol was not mixed in Example 1.

Comparative Example 2

A super absorbent polymer powder was obtained in the same manner as in Comparative Example 1, except that the temperature of the surface crosslinking reaction was set to 195° C. in Comparative Example 1.

Comparative Example 3

A super absorbent polymer powder was obtained in the same manner as in Example 1, except that 0.05 part by weight of silica filler (DM30S) was dry mixed instead of stearyl alcohol in Example 1.

Experimental Example

The physical properties of the super absorbent polymers prepared in Examples and Comparative Examples were evaluated by the following methods.

(1) Centrifuge Retention Capacity (CRC) The centrifuge retention capacity by water absorption capacity under a non-loading condition was measured for the respective polymers in accordance with EDANA (European Disposables and Nonwovens Association) recommended test method No. WSP 241.3.

Specifically, $W_0$ (g, about 0.2 g) of the polymer respectively obtained through Examples and Comparative Examples was uniformly put in a nonwoven fabric-made bag and sealed. Then, the bag was immersed in a physiological saline solution (0.9 wt %) at room temperature. After 30 minutes elapsed, water was removed from the bag by centrifugation at 250 G for 3 minutes, and the weight $W_2$ (g) of the bag was then measured. Further, the same procedure was carded out without using the super absorbent polymer, and then the resultant weight $W_1$ (g) was measured. Using the respective weights thus obtained, CRC (g/g) was calculated according to the following Mathematical Formula 1:

$$CRC(g/g) = \{[W_2(g) - W_1(g)]/W_0(g)\} - 1 \quad \text{[Mathematical Formula 1]}$$

(2) Absorbency Under Load (AUL)

The absorbency under load of each polymer at 0.7 psi was measured according to EDANA recommended test method No. WSP 242.3.

Specifically, a 400 mesh wire net made of stainless steel was installed at the bottom of a plastic cylinder having an inner diameter of 25 mm. $W_0$ (g, 0.16 g) of the super absorbent polymer were uniformly sprayed onto the wire net under conditions of a room temperature and a relative humidity of 50%. Then, a piston capable of uniformly providing a load of 0.7 psi was put thereon, in which the external diameter of the piston was slightly smaller than 25 mm, there was no gap between the internal wall of the cylinder and the piston, and the jig-jog of the cylinder was not interrupted. At this time, the weight $W_3$ (g) of the device was measured.

A glass filter having a diameter of 90 mm and a thickness of 5 mm was placed in a Petri dish having the diameter of 150 mm, and then a physiological saline solution composed of 0.9 wt % of sodium chloride was poured in the dish until the surface level became equal to the upper surface of the glass filter. A sheet of filter paper having a diameter of 90 mm was put thereon. The measuring device was put on the filter paper and the solution was absorbed for 1 hour under a load. After 1 hour, the weight $W_4$ (g) was measured after lifting up the measuring device.

Using the respective weights thus obtained, the absorbency under load (g/g) was calculated according to the following Formula:

$$AUP(g/g) = [W_4(g) - W_3(g)]/W_0(g) \quad \text{[Mathematical Formula 2]}$$

(3) Saline Flow Conductivity (SFC)

The saline flow conductivity (SFC) was measured according to the method disclosed in [0184]-[0189] in column 16 of US Patent Application Publication No. 2009-0131255.

(4) Surface Tension

All procedures were carried out in a constant-temperature and constant-humidity chamber (temperature 23±2° C., relative humidity 45±10%).

150 g of a physiological saline solution composed of 0.9 wt % sodium chloride was placed in a 250 mL beaker, and stirred with a magnetic bar. 1.0 g of the super absorbent polymer was added to the stirring solution and stirred for 3 minutes. After the stirring was stopped, the swollen super absorbent polymer was allowed to stand so that it settles to the bottom for at least 15 minutes.

Then, a supernatant (a solution immediately below the surface) was extracted with a pipette and transferred to another clean cup, and then the surface tension was measured using a surface tension meter (Kruss K11/K100).

The physical property values according to Examples and Comparative Examples are shown in Table 1 below.

TABLE 1

| | CRC (g/g) | AUL (g/g) | SFC ($*10^{-7}$ cm³ * sec/g) | Surface tension (mN/m) | P* |
|---|---|---|---|---|---|
| Example 1 | 27.2 | 25.1 | 55 | 71.74 | 1.05 |
| Example 2 | 27.1 | 24.7 | 50 | 71.71 | 0.97 |
| Example 3 | 27.1 | 25.0 | 53 | 71.59 | 1.02 |
| Example 4 | 27.4 | 24.8 | 50 | 71.44 | 0.96 |
| Example 5 | 26.9 | 25.3 | 60 | 71.53 | 1.15 |
| Example 6 | 27 | 25.0 | 60 | 71.53 | 1.06 |

TABLE 1-continued

| | CRC (g/g) | AUL (g/g) | SFC (*10⁻⁷ cm³ * sec/g) | Surface tension (mN/m) | P* |
|---|---|---|---|---|---|
| Example 7 | 27.2 | 24.9 | 52 | 71.55 | 1.00 |
| Comparative Example 1 | 27.1 | 24.0 | 42 | 71.57 | 0.82 |
| Comparative Example 2 | 26.3 | 25.0 | 62 | 71.64 | 1.21 |
| Comparative Example 3 | 26.4 | 24.3 | 85 | 71.34 | 1.68 |

*In Table 1 above, P is a value calculated by the following Equation 1.
[Equation 1]
$P = SFC * 10^7/(CRC + AUL)$ Referring to Table 1 above, it can be seen that the super absorbent polymer prepared according to the method of the present invention as described in Examples 1 to 7 exhibited excellent absorption capacity and permeability properties.

In Comparative Example 1 in which the aliphatic alcohol of C6 or greater was not used, the permeability properties were not satisfactory. In Comparative Example 2, the permeability was improved by increasing the surface crosslinking temperature, but the CRC was deteriorated. On the other hand, when the surface crosslinking reaction was carried out by mixing the inorganic filler as in Comparative Example 3, the permeability was improved, but both CRC and AUL were not good.

Generally, when the permeability is high, the centrifuge retention capacity and the absorbency under load tend to be lowered. That is, when the crosslinking degree is high and the strength of the hydrogel is high, the permeability is high. Therefore, it is difficult to increase the centrifuge retention capacity, the absorbency under load and the permeability at the same time. However, as can be seen from the results of Examples and Comparative Examples, the super absorbent polymer prepared by the preparation method of the present invention has not only a high centrifuge retention capacity and a high absorbency under load but also a high permeability. It can be analyzed that these results are attributed to the fact that the aliphatic alcohol of C6 or greater introduced in the surface crosslinking reaction is located on the surface of the absorbent resin to thereby prevent the polymers from aggregating together, thereby enhancing the permeability. In addition, it can be seen that it has an effect of increasing the surface tension by preventing leakage of urine.

What is claimed is:

1. A method for preparing a super absorbent polymer comprising:
    thermally polymerizing or photo-polymerizing a monomer composition including an acrylic acid-based monomer having an acidic group, of which at least a part is neutralized, and a polymerization initiator to form a hydrogel polymer;
    drying the hydrogel polymer;
    pulverizing the dried polymer;
    mixing the pulverized polymer with a surface crosslinking agent and an aliphatic alcohol of C6 to C20;
    heating the polymer obtained by mixing the surface crosslinking agent and the aliphatic alcohol of C6 to C20 to a temperature of 160 to 200° C. to carry out a surface modification.

2. The method for preparing a super absorbent polymer according to claim 1, wherein the aliphatic alcohol of C6 to C20 includes one or more selected from the group consisting of stearyl alcohol, lauryl alcohol, and cetyl alcohol.

3. The method for preparing a super absorbent polymer according to claim 1, wherein the aliphatic alcohol of C6 to C20 is mixed in an amount of 0.001 to 2 parts by weight based on 100 parts by weight of the pulverized polymer.

4. The method for preparing a super absorbent polymer according to claim 1, wherein the aliphatic alcohol of C6 to C20 is added separately before adding the surface crosslinking agent, to the pulverized polymer, or is added together with the surface crosslinking agent.

5. The method for preparing a super absorbent polymer according to claim 1, wherein the super absorbent polymer has P defined by the following Equation 1 of 0.85 to 1.20:

$P = SFC * 10^7/(CRC+AUL)$     [Equation 1]

in Equation 1,
CRC means a centrifuge retention capacity (unit: g/g) measured according to EDANA method WSP 241.3,
AUL means an absorbency under load (unit: g/g) at 0.7 psi measured according to EDANA method WSP 242.3, and
SFC means a saline flow conductivity (unit: cm³*sec/g).

6. A super absorbent polymer comprising a crosslinked polymer obtained by polymerizing and internally crosslinking an acrylic acid-based monomer having an acidic group, of which at least a part is neutralized; and a surface modifying layer formed on the surface of the crosslinked polymer,
    wherein a centrifuge retention capacity (CRC) measured according to EDANA method WSP 241.3 is 25 to 35 g/g, an absorbency under load (AUL) at 0.7 psi measured according to EDANA method WSP 242.3 is 20 to 30 g/g, and a surface tension is 65 to 73 mN/m.

7. The super absorbent polymer according to claim 6, wherein the surface modifying layer includes an alkyl group of C6 to C20.

8. The super absorbent polymer according to claim 6, wherein the super absorbent polymer has a saline flow conductivity (SFC) of $45 \times 10^{-7}$ to $80 \times 10^{-7}$ cm³×sec/g.

9. The super absorbent polymer according to claim 6, wherein P defined by the following Equation 1 is 0.85 to 1.20:

$P = SFC * 10^7/(CRC+AUL)$     [Equation 1]

in Equation 1,
CRC means a centrifuge retention capacity (unit: g/g) measured according to EDANA method WSP 241.3,
AUL means an absorbency under load (unit: g/g) at 0.7 psi measured according to EDANA method WSP 242.3, and
SFC means a saline flow conductivity (unit: cm³×sec/g).

* * * * *